(12) United States Patent
Yan et al.

(10) Patent No.: US 12,429,758 B2
(45) Date of Patent: Sep. 30, 2025

(54) DISPLAY APPARATUS AND DISPLAY SYSTEM

(71) Applicant: Shenzhen Yinwang Intelligent Technologies Co., Ltd., Shenzhen (CN)

(72) Inventors: Yunfei Yan, Dongguan (CN); Tianhai Chang, Dongguan (CN); Zhiyong Huang, Dongguan (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 400 days.

(21) Appl. No.: 17/983,604

(22) Filed: Nov. 9, 2022

(65) Prior Publication Data

US 2023/0072734 A1 Mar. 9, 2023

Related U.S. Application Data

(63) Continuation of application No. PCT/CN2021/092860, filed on May 10, 2021.

(30) Foreign Application Priority Data

May 15, 2020 (CN) .......................... 202010412404.7

(51) Int. Cl.
*G03B 21/28* (2006.01)
*B60K 35/00* (2024.01)
(Continued)

(52) U.S. Cl.
CPC .............. *G03B 21/28* (2013.01); *B60K 35/00* (2013.01); *G02B 27/0101* (2013.01);
(Continued)

(58) Field of Classification Search
CPC ... G02B 27/01–0189; G02B 2027/0105–0198; B60K 35/00–90; B60K 2360/00–96
See application file for complete search history.

(56) References Cited

U.S. PATENT DOCUMENTS

2013/0021224 A1 1/2013 Fujikawa et al.
2016/0278246 A1 9/2016 Yu et al.
(Continued)

FOREIGN PATENT DOCUMENTS

CN 101387760 A 3/2009
CN 101622568 A 1/2010
(Continued)

*Primary Examiner* — Christopher A Lamb, II
(74) *Attorney, Agent, or Firm* — Leydig, Voit & Mayer, Ltd.

(57) ABSTRACT

A display apparatus and a display system are provided, and relate to the field of display device technologies, to enhance visual experience generated when a picture is displayed by using an existing reflective display window such as a windshield and a bathroom mirror, so that a sense of presence and immersion is improved. The display apparatus includes an image generation unit and an optical imaging unit. The image generation unit is configured to generate a real image whose display surface is a curved surface. The optical imaging unit is configured to perform imaging on the real image, to generate an enlarged virtual image corresponding to the real image, where a display surface of the virtual image is a curved surface adaptive to the display surface of the real image.

20 Claims, 5 Drawing Sheets

(51) Int. Cl.
  *B60K 35/23* (2024.01)
  *B60K 35/28* (2024.01)
  *G02B 27/01* (2006.01)
  *G03B 21/00* (2006.01)
  *G03B 21/60* (2014.01)
(52) U.S. Cl.
  CPC ............ *G03B 21/006* (2013.01); *G03B 21/60* (2013.01); *B60K 35/23* (2024.01); *B60K 35/28* (2024.01); *B60K 2360/166* (2024.01); *B60K 2360/167* (2024.01); *B60K 2360/23* (2024.01)

(56) References Cited

U.S. PATENT DOCUMENTS

| | | | |
|---|---|---|---|
| 2017/0154406 | A1 | 6/2017 | Atsuumi et al. |
| 2017/0364028 | A1* | 12/2017 | Christmas ............ G03H 1/2249 |
| 2019/0317323 | A1* | 10/2019 | Yamaoka ............ G02B 6/0011 |
| 2022/0013046 | A1* | 1/2022 | Mori ...................... G02B 30/27 |

FOREIGN PATENT DOCUMENTS

| | | |
|---|---|---|
| CN | 104006358 A | 8/2014 |
| CN | 106415365 A | 2/2017 |
| CN | 106461947 A | 2/2017 |
| CN | 106483664 A | 3/2017 |
| CN | 106802535 A | 6/2017 |
| CN | 107238927 A | 10/2017 |
| CN | 110286484 A | 9/2019 |
| CN | 110300914 A | 10/2019 |
| CN | 110770635 A | 2/2020 |
| CN | 113671696 B | 10/2022 |
| DE | 102007058295 A1 | 6/2009 |
| GB | 2526159 A | 11/2015 |
| JP | H07261087 A | 10/1995 |
| JP | H08244495 A | 9/1996 |
| JP | 2002214543 A | 7/2002 |
| JP | 2006047608 A | 2/2006 |
| JP | 2011007995 A | 1/2011 |
| JP | 2013047698 A | 3/2013 |
| JP | 2017524987 A | 8/2017 |
| JP | 2018112628 A | 7/2018 |
| JP | 2019142305 A | 8/2019 |
| KR | 20180066162 A | 6/2018 |
| WO | 02056112 A1 | 7/2002 |
| WO | 2017061039 A1 | 4/2017 |
| WO | 2020009217 A1 | 1/2020 |

* cited by examiner

DISPLAY APPARATUS AND DISPLAY SYSTEM

CROSS-REFERENCE TO RELATED APPLICATIONS

This application is a continuation application of International application No. PCT/CN2021/092860, filed on May 10, 2021, which claims priority to Chinese Patent Application No. 202010412404.7, filed on May 15, 2020. The disclosures of the aforementioned applications are hereby incorporated by reference in their entireties.

TECHNICAL FIELD

The embodiments relate to the field of display technologies, a display apparatus, and a display system.

BACKGROUND

Currently, no display window needs to be additionally disposed in a display system that reflects a display picture by using existing transparent glass, translucent glass, or a reflector. Therefore, the display system is applicable to a scenario in which space on a wall surface is narrow and the transparent glass, the translucent glass, or the reflector is disposed. For example, in a cockpit of a device such as a vehicle, aircraft, or a train, a windshield of the cockpit may be used to display information about a driving speed, a rotation speed of an engine, a navigation picture, or the like. For another example, in a bathroom, a bathroom mirror may be used to display information about weather, air quality or the like that are of a current day. The windshield, the bathroom mirror, and the like that are configured to display a picture may be collectively referred to as a reflective display window. As the technology develops, current visual experience brought by using these reflective display windows to display a picture is not enough for a user, and the user requires a better sense of presence and immersion.

SUMMARY

The embodiments provide a display apparatus and a display system, to enhance visual experience generated when a picture is displayed by using a reflective display window and improve a sense of presence and immersion.

To achieve the foregoing objectives, the following solutions are used in the embodiments.

According to a first aspect, some embodiments may provide a display apparatus, where the display apparatus includes an image generation unit and an optical imaging unit. The image generation unit is configured to generate a real image whose display surface is a curved surface, and the optical imaging unit is configured to perform imaging on the real image to generate an enlarged virtual image corresponding to the real image, where a display surface of the virtual image is a curved surface adaptive to the display surface of the real image.

The display apparatus may include the image generation unit and the optical imaging unit. The image generation unit is configured to generate a real image whose display surface is a curved surface, and the optical imaging unit is configured to perform imaging on the real image to generate an enlarged virtual image corresponding to the real image, where a display surface of the virtual image is a curved surface adaptive to the display surface of the real image. Therefore, when the display apparatus is applied to a display system, an image surface of the optical imaging unit of the display apparatus is opposite to a reflective display window. An imaging beam emitted from the image surface of the optical imaging unit is incident onto the reflective display window and is reflected by the reflective display window to eyes of a user, so that the user can view, on the reflective display window, the enlarged virtual image generated by the optical imaging unit. Because the display surface of the virtual image is a curved surface, and a curved image can bring better visual experience than a planar image, a sense of presence and immersion is improved.

In a possible implementation, the optical imaging unit is a lens group. The lens group includes at least one stacked lens, and an end surface of the lens group faces the display surface of the real image along a stacking direction of the at least one lens. In this way, when the display apparatus provided in this embodiment is applied to a display system, the optical imaging unit is located between the image generation unit and the reflective display window. The optical imaging unit transmits only an incident image beam, and an optical axis of a transmitted imaging beam is collinear with an optical axis of the image beam incident onto the optical imaging unit. Therefore, an optical path between the image generation unit and the reflective display window is not deflected, which helps to determine a relative position between the image generation unit, the optical imaging unit, and the reflective display window.

In a possible implementation, the optical imaging unit is a concave reflector, and a reflective concave surface of the concave reflector faces the display surface of the real image. In this way, when the display apparatus provided in this embodiment is applied to a display system, real image light generated by the image generation unit is deflected through reflection of the optical imaging unit once, and then is incident onto the reflective display window. An arrangement direction of the image generation unit and the optical imaging unit and an arrangement direction of the optical imaging unit and the reflective display window form an angle, which helps to reduce a size of the display apparatus in the arrangement direction of the optical imaging unit and the reflective display window. The size of the display apparatus in the arrangement direction of the optical imaging unit and the reflective display window is a height occupied by the display apparatus in the display system. Therefore, this helps to reduce the height occupied by the display apparatus in the display system.

In a possible implementation, the image generation unit is a curved display screen or a display device with a curved display screen. This structure is simple and easy to implement.

In a possible implementation, the image generation unit is a display screen with a flexible curved surface, which helps to adjust curvature of the display surface of the real image.

In a possible implementation, the image generation unit includes a diffusing screen and a projection apparatus. A diffusing surface of the diffusing screen is a curved surface, and the diffusing surface of the diffusing screen is the display surface of the real image. The projection apparatus is configured to generate an image beam whose imaging surface is adaptive to the diffusing surface of the diffusing screen, and the image beam is projected onto the diffusing surface of the diffusing screen, to form a real image. This structure is simple and easy to implement.

In a possible implementation, the projection apparatus includes a projection host and a spatial light modulator. The projection host is configured to generate an image beam whose imaging surface is a planar surface. The spatial light modulator is opposite to a light emitting surface of the projection host, and the spatial light modulator is configured to adjust a phase of each light ray in the image beam whose imaging surface is a planar surface, to generate an image beam whose imaging surface is adaptive to the diffusing surface of the diffusing screen. This structure is simple and easy to implement.

In a possible implementation, the spatial light modulator is a liquid crystal on silicon spatial light modulator or a micro electro mechanical systems spatial light modulator.

In a possible implementation, a first lens is disposed between the projection host and the spatial light modulator, and the first lens is configured to converge image beams generated by the projection host, so that all the image beams are projected onto the spatial light modulator as much as possible, thereby avoiding an optical path loss.

In a possible implementation, a second lens is disposed on a light emitting side of the spatial light modulator, and the second lens is configured to converge image beams modulated by the spatial light modulator, so that all the image beams are projected onto the diffusing screen as much as possible, thereby avoiding an optical path loss.

In a possible implementation, the diffusing screen includes a support structure and a flexible screen body. The support structure is a curved sheet-like structure. The flexible screen body is attached and fastened to a surface of the support structure. The diffusing surface of the diffusing screen is a surface that is of the screen body and that is away from the support structure. In this way, the support structure supports the screen body, which can ensure flatness of the screen body.

In a possible implementation, the support structure may be a structure that can be bent. In this way, curvature of the screen body attached and fastened to the support structure may be adjusted, to adjust curvature of the display surface of the real image.

In a possible implementation, the support structure includes a first material layer and a second material layer that are stacked. A coefficient of thermal expansion of the first material layer is different from a coefficient of thermal expansion of the second material layer. The screen body is located on a side that is of the first material layer and that is away from the second material layer. The diffusing screen further includes a temperature adjustment apparatus, and the temperature adjustment apparatus is configured to adjust a temperature of the support structure. In this way, the temperature adjustment apparatus may be used to change the temperature of the support structure. Because the coefficient of thermal expansion of the first material layer is different from the coefficient of thermal expansion of the second material layer, a change occurs in bending curvature of the support structure when the temperature of the support structure is adjusted, so that the support structure can be bent. In this way, curvature adjustment of the support structure is automatically controlled.

In a possible implementation, the display surface of the real image generated by the image generation unit is a concave arc surface recessed to the inside of the image generation unit.

According to a second aspect, some embodiments may provide a display system, where the display system includes a reflective display window and the display apparatus according to any of the foregoing solutions. An image surface of an optical imaging unit of the display apparatus faces the reflective display window, so that a user can view, by using the reflective display window, an enlarged virtual image generated by the optical imaging unit.

The display system provided in this embodiment of may include the display apparatus. Therefore, the display system and the display apparatus may resolve a same problem and achieve a same expected effect.

In a possible implementation, the reflective display window is a windshield at the front of a cockpit.

In a possible implementation, a display surface of a real image generated by an image generation unit of the display apparatus is a concave arc surface recessed to the inside of the image generation unit, and a circle center line of a display surface of a virtual image generated by the optical imaging unit extends in a front and rear direction of the reflective display window. In this way, a contour line of the display surface of the virtual image that is viewed by the user on the reflective display window is an arc line that is in a horizontal plane and that extends around a circumferential direction of the user. Therefore, the user can view image information at an edge of a display picture without moving a line of sight, thereby improving visual experience.

DETAILED DESCRIPTION OF THE EMBODIMENTS

The terms "first" and "second" in the embodiments are merely intended for a purpose of description and shall not be understood as an indication or implication of relative importance or implicit indication of a quantity of indicated features. Therefore, a feature limited by "first" or "second" may explicitly or implicitly include one or more features.

Currently, in a display system displaying a picture by using a reflective display window such as a windshield or a bathroom mirror, an image displayed on the reflective display window is usually a planar image. The planar image has little impact on a user's visual feeling, and therefore a sense of presence and immersion is relatively poor, and visual fatigue appears after the display system is used for a long time, causing relatively poor sense of comfort.

To resolve the foregoing problem, the embodiments may provide a display system, where the display system includes, but is not limited to, a cockpit windshield display system and a bathroom mirror display system. The display system includes a display apparatus and a reflective display window. The display apparatus is configured to generate an image.

The reflective display window includes, but is not limited to, a windshield in a cockpit and a bathroom mirror. The reflective display window is configured to reflect an imaging beam generated by the display apparatus to eyes of a user, so that the user can view, by using the reflective display window, an image generated by the display apparatus.

Figure 1:
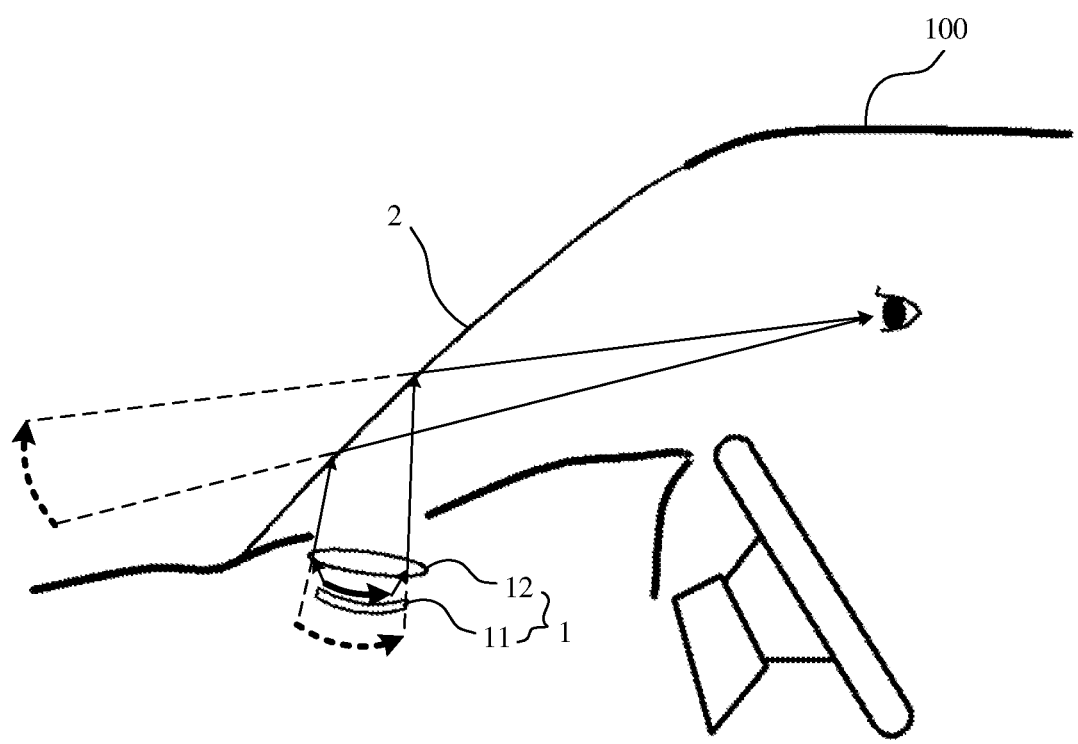
FIG. 1 is a schematic diagram of a structure of a display system according to some embodiments.

FIG. 1 is a schematic diagram of a structure of a display system according to some embodiments. The display system is a cockpit windshield display system. The display system may be a cockpit windshield display system of a vehicle, aircraft, a train, or the like. As shown in FIG. 1, the cockpit windshield display system includes a display apparatus 1 disposed in a dashboard of a cockpit 100 and a windshield 2 located at the front of the cockpit 100. The display apparatus 1 is configured to generate an image, and the image can display a driving speed, a rotation speed of an engine, or a navigation picture. The windshield 2 is transparent glass. A driver in the cockpit 100 can view an environment situation outside the cockpit 100 by using the windshield 2, and the windshield 2 can reflect, to eyes of the driver, an imaging beam generated by the display apparatus 1, so that the driver can view an image generated by the display apparatus 1 by using the windshield 2.

Figure 2:
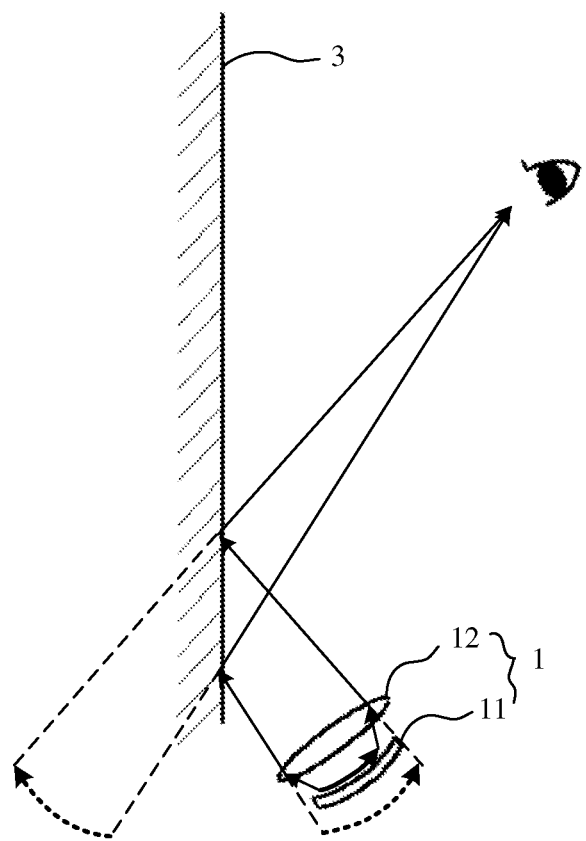
FIG. 2 is a schematic diagram of a structure of a display system according to some other embodiments.

FIG. 2 is a schematic diagram of a structure of a display system according to some other embodiments. The display system is a bathroom mirror display system. The display system may be a mirror display system in a home or public bathroom. As shown in FIG. 2, the bathroom mirror display system includes a display apparatus 1 and a bathroom mirror 3. The display apparatus 1 is configured to generate an image, and the image may display time, weather, or an air condition. The bathroom mirror 3 is a planar reflector, and a user can check appearance by using the bathroom mirror 3. In addition, the bathroom mirror 3 can reflect, to eyes of the user, an imaging beam generated by the display apparatus 1, so that the user can view, by using the bathroom mirror 3, an image generated by the display apparatus 1.

The embodiments may further provide a display apparatus. The display apparatus is a display apparatus in the foregoing display system, and the display apparatus includes an image generation unit and an optical imaging unit. The image generation unit is configured to generate a real image whose display surface is a curved surface. The optical imaging unit is configured to perform imaging on the real image to generate an enlarged virtual image corresponding to the real image. A display surface of the virtual image is a curved surface adaptive to the display surface of the real image. The optical imaging unit may be a transmission imaging element, or may be a reflection imaging element, which is not limited herein.

Figure 3:
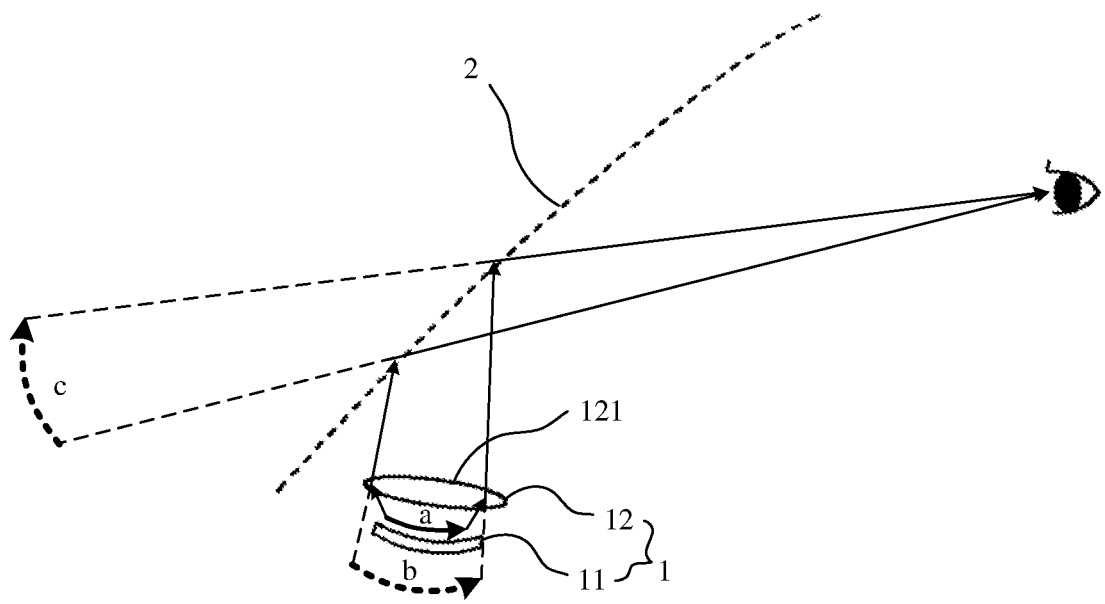
FIG. 3 is a schematic diagram of a structure of a display apparatus according to some embodiments.

FIG. 3 is a schematic diagram of a structure of a display apparatus according to some embodiments. The display apparatus is an example of the display apparatus 1 in the cockpit windshield display system shown in FIG. 1. As shown in FIG. 3, the display apparatus 1 includes an image generation unit 11 and an optical imaging unit 12. The image generation unit 11 generates a real image a, and a display surface of the real image a is a curved surface. The optical imaging unit 12 is a transmission imaging element. The optical imaging unit 12 may be a lens group. The lens group includes at least one stacked lens, and an end surface of the lens group faces the display surface of the real image a along a stacking direction of the at least one lens. Real image light generated by the real image a is incident onto the optical imaging unit 12 and is transmitted by the optical imaging unit 12. A beam transmitted by the optical imaging unit 12 is an imaging beam. An enlarged virtual image b corresponding to the real image a is formed on a reverse extension line of the imaging beam. A display surface of the virtual image b is a curved surface adaptive to the display surface of the real image a. When the display apparatus 1 is applied to the cockpit windshield display system shown in FIG. 1, an image surface 121 of the optical imaging unit 12 is opposite to an inner surface of the windshield 2. In this way, the imaging beam is incident onto the inner surface of the windshield 2 and is reflected by the inner surface of the windshield 2 to eyes of a driver. Therefore, the windshield 2 performs mirror imaging on the enlarged virtual image b, and a virtual image c having a same size as the virtual image b is formed on an outer side of the windshield 2. In this way, the driver can view the virtual image c on the windshield 2. It should be noted that in this embodiment, to form the enlarged virtual image b on the reverse extension line of the imaging beam, a distance between the optical imaging unit 12 and each point on the real image a generated by the image generation unit 11 needs to be less than an equivalent focal length of the optical imaging unit 12.

In this way, the optical imaging unit 12 is located between the image generation unit 11 and the windshield 2. The optical imaging unit 12 transmits only an incident image beam, and an optical axis of a transmitted imaging beam is collinear with an optical axis of the image beam incident onto the optical imaging unit 12. Therefore, an optical path between the image generation unit 11 and the windshield 2 is not deflected, which helps to determine a relative position between the image generation unit 11, the optical imaging unit 12, and the windshield 2.

The optical imaging unit 12 is a lens group, and the lens group may include one lens, or may include a plurality of lenses, which is not limited herein. FIG. 3 shows only an example in which a lens group includes one convex lens, and this constitutes no limitation on a structure of the lens group.

It should be noted that the display surface of the real image a generated by the image generation unit 11 may be a concave arc surface, a convex arc surface, a wave-like curved surface, or the like, which is not limited herein. FIG. 3 shows only an example in which the display surface of the real image a is a concave arc surface recessed to the inside of the image generation unit 11, and this constitutes no limitation on a bending shape of the display surface of the real image a.

The image generation unit 11 may be a curved display screen. The curved display screen may be a curved liquid crystal display (LCD) screen, a curved organic light emitting diode (OLED) display screen, a curved micro light emitting diode (Micro-LED) display screen, or the like. The image generation unit 11 may alternatively be a display device with a curved display screen, such as a mobile phone or a tablet computer. The image generation unit 11 may further be a projection display device including a curved diffusing screen. This is not limited herein. When the image generation unit 11 is a curved display screen, the image generation unit 11 may be a flexible curved display screen, and bending curvature of the flexible curved display screen may be changed, thereby facilitating adjustment of curvature of the display surface of the real image a. FIG. 3 shows only an example in which the image generation unit 11 is a flexible curved display screen, and this constitutes no limitation on a structure of the image generation unit 11.

Figure 4:
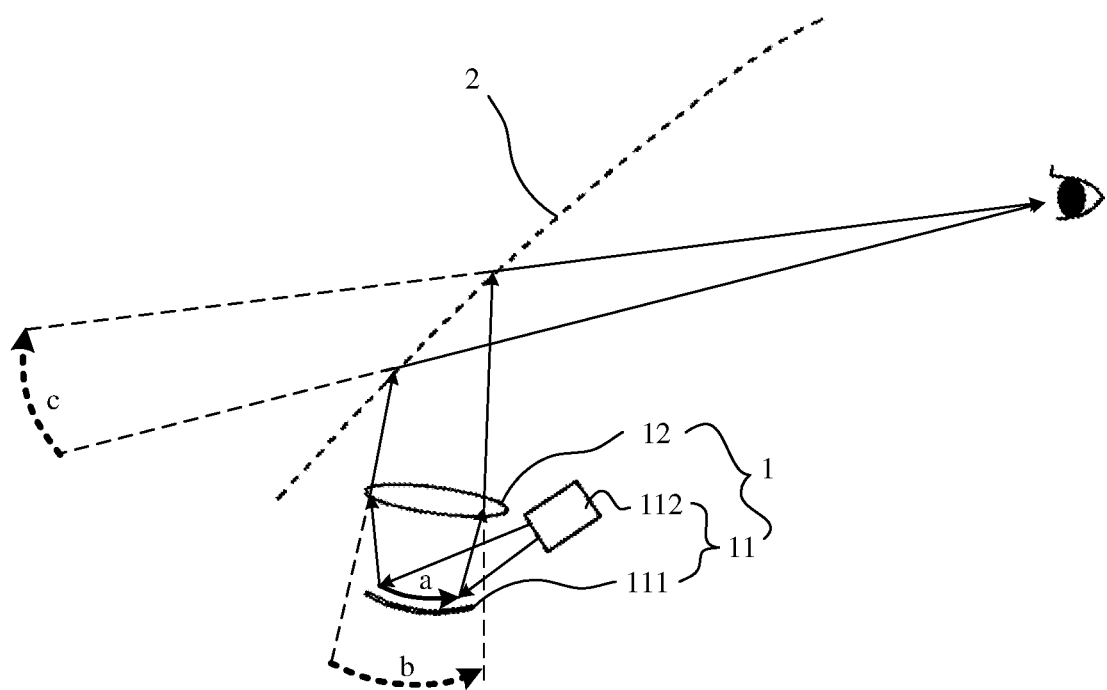
FIG. 4 is a schematic diagram of a structure of a display apparatus according to some other embodiments.

In another example of the image generation unit 11, as shown in FIG. 4, the image generation unit 11 includes a diffusing screen 111 and a projection apparatus 112. A diffusing surface of the diffusing screen 111 is a curved surface, and the diffusing surface of the diffusing screen 111 is the display surface of the real image a. The projection apparatus 112 is configured to generate an image beam whose imaging surface is adaptive to the diffusing surface of the diffusing screen 111, and the image beam is projected onto the diffusing surface of the diffusing screen 111, to form the real image a. This structure is simple and easy to implement.

In the embodiment shown in FIG. 4, the diffusing screen 111 may be a diffusing screen of a transmission display type or may be a diffusing screen of a reflection display type, which is not limited herein. FIG. 4 shows only an example in which the diffusing screen 111 is diffusing screen of a reflection display type, but this cannot be considered as a limitation on a structure of the diffusing screen 111.

The diffusing screen 111 may be an integral structure component made of a diffusing material or may include a support structure and a flexible diffusing screen body supported on the support structure, which is not limited herein.

Figure 5:
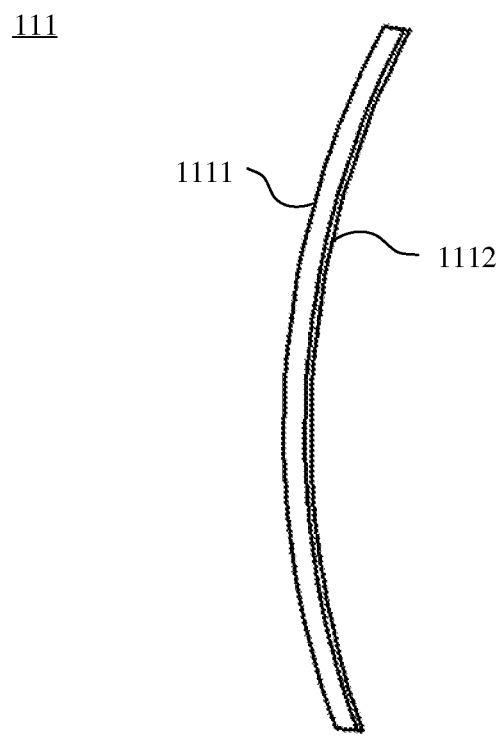
FIG. 5 is a schematic diagram of a structure of a diffusing screen of a display apparatus according to some embodiments.

FIG. 5 is a schematic diagram of a structure of a diffusing screen of a display apparatus according to some embodiments. As shown in FIG. 5, the diffusing screen 111 includes a support structure 1111 and a flexible screen body 1112. The support structure 1111 has a hardness, a material of the support structure 1111 includes, but is not limited to, plastic and metal, and the support structure 1111 is a curved sheet-like structure. The screen body 1112 is attached and fastened to a surface of the support structure 1111, and the diffusing surface of the diffusing screen 111 is a surface that is of the support structure 1111 and that is away from the screen body 1112. In this way, the support structure 1111 supports the screen body 1112, which can ensure flatness of the screen body 1112.

The support structure 1111 may be a rigid structure, or may be a structure that can be bent, which is not limited herein. In some embodiments, the support structure 1111 is a structure that can be bent, so that curvature of the screen body 1112 attached and fastened to the support structure can be adjusted, to adjust curvature of the display surface of the real image a.

To enable the support structure 1111 to be bent, in some embodiments, the support structure 1111 is made of a material with ductility and malleability, such as copper and iron. The material with ductility and malleability has a flexibility and can be bent. This structure is simple and easy to implement.

Figure 6:
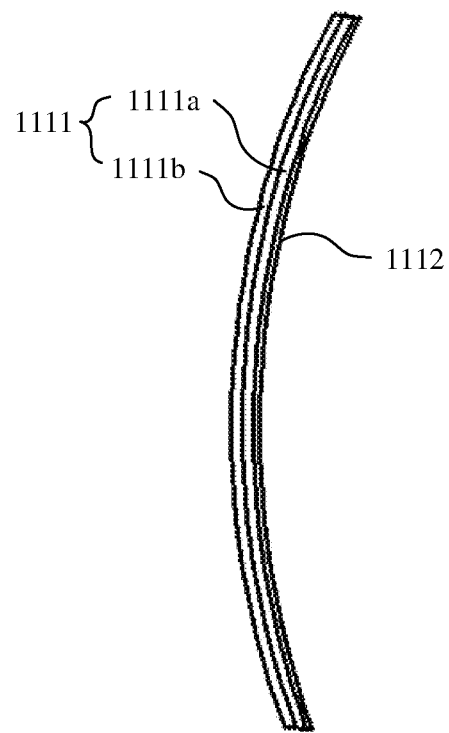
FIG. 6 is a schematic diagram of a structure of a diffusing screen of a display apparatus according to some other embodiments.

In some other embodiments, as shown in FIG. 6, the support structure 1111 includes a first material layer 1111a and a second material layer 1111b that are stacked. A coefficient of thermal expansion of the first material layer 1111a is different from a coefficient of thermal expansion of the second material layer 1111b. The screen body 1112 is located on a side that is of the first material layer 1111a and that is away from the second material layer 1111b. The diffusing screen 111 further includes a temperature adjustment apparatus (not shown in the figure). The temperature adjustment apparatus includes, but is not limited to, a heating apparatus and a cooling apparatus, and the temperature adjustment apparatus is configured to adjust a temperature of the support structure 1111. In this way, the temperature adjustment apparatus may be used to change the temperature of the support structure 1111. Because the coefficient of thermal expansion of the first material layer 1111a is different from the coefficient of thermal expansion of the second material layer 1111b, a change occurs in a bending curvature of the support structure 1111 when the temperature of the support structure 1111 is adjusted, so that the support structure 1111 can be bent. In this way, curvature adjustment of the support structure 1111 is automatically controlled.

The coefficient of thermal expansion of the first material layer 1111a may be greater than the coefficient of thermal expansion of the second material layer 1111b or may be less than the coefficient of thermal expansion of the second material layer 1111b. This is not limited herein, provided that the coefficient of thermal expansion of the first material layer 1111a is different from the coefficient of thermal expansion of the second material layer 1111b and bending curvature of the support structure 1111 can be effectively adjusted in a temperature adjustment range of the temperature adjustment apparatus.

Figure 7:
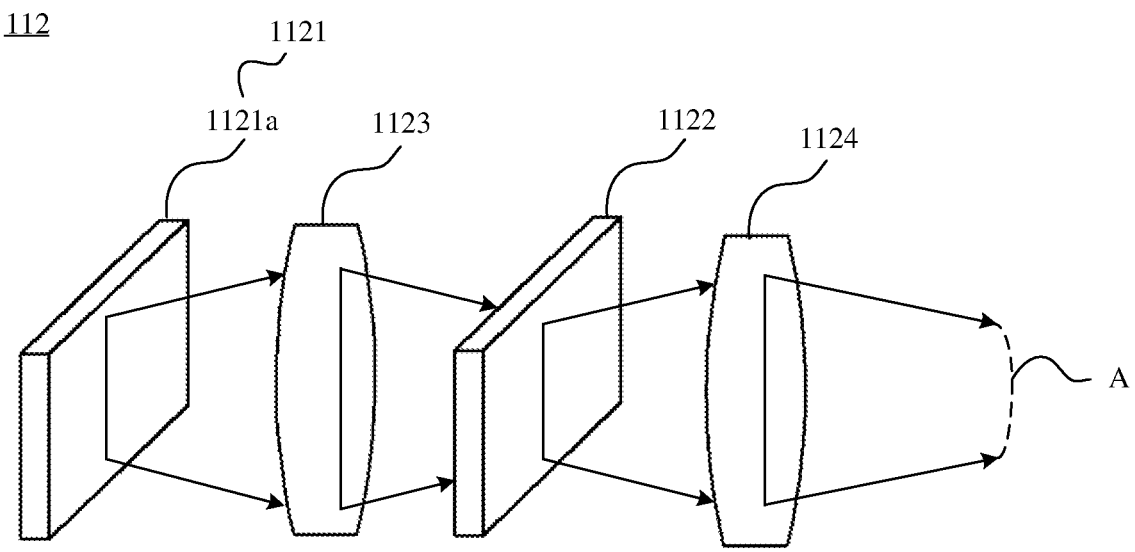
FIG. 7 is a schematic diagram of a structure of a projection apparatus of a display apparatus according to some embodiments.

To enable the projection apparatus 112 to generate an image beam whose imaging surface is adaptive to the diffusing surface of the diffusing screen 111, FIG. 7 is a schematic diagram of a structure of a projection apparatus of a display apparatus according to some embodiments. As shown in FIG. 7, the projection apparatus 112 includes a projection host 1121 and a spatial light modulator 1122. The projection host 1121 is configured to generate an image beam whose imaging surface is a planar surface. The projection host 1121 has a plurality of types of structural forms. For example, the projection host 1121 may include a laser light source and a digital mirror device (DMD) 1121a. The laser light source emits an illumination beam to the DMD 1121a, and the DMD 1121a generates, based on the illumination beam, an image beam whose imaging surface is a planar surface. The spatial light modulator 1122 is opposite to a light emitting surface of the projection host 1121, and the spatial light modulator 1122 is configured to adjust a phase of each light ray in the image beam that is generated by the projection host 1121 and whose imaging surface is a planar surface, to generate an image beam whose imaging surface is adaptive to the diffusing surface of the diffusing screen. This structure is simple and easy to implement.

In the foregoing embodiment, the spatial light modulator 1122 includes, but is not limited to, a liquid crystal on silicon (LCoS) spatial light modulator and a micro electro mechanical systems (MEMS) spatial light modulator.

To project all image beams generated by the projection host 1121 onto the spatial light modulator 1122, in some embodiments, as shown in FIG. 7, a first lens 1123 is disposed between the projection host 1121 and the spatial light modulator 1122. The first lens 1123 is configured to converge the image beams generated by the projection host 1121, so that all the image beams are projected onto the spatial light modulator 1122 as much as possible, thereby avoiding an optical path loss.

To project all image beams modulated by the spatial light modulator 1122 onto the diffusing screen, in some embodiments, as shown in FIG. 7, a second lens 1124 is disposed on a light emitting side of the spatial light modulator 1122. The second lens 1124 is configured to converge the image beams modulated by the spatial light modulator 1122, so that all the image beams are projected onto the diffusing screen as much as possible, thereby avoiding an optical path loss.

Figure 8:
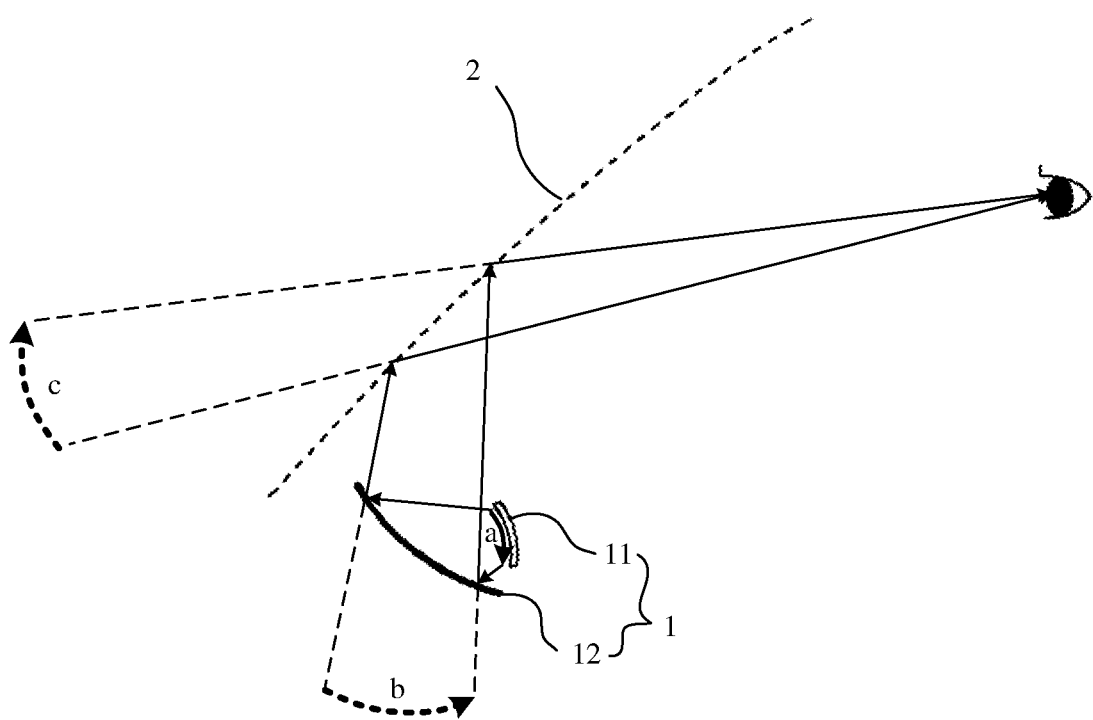
FIG. 8 is a schematic diagram of a structure of a display apparatus according to some other embodiments.

FIG. 8 is a schematic diagram of a structure of a display apparatus according to some other embodiments. The display apparatus is another example of the display apparatus 1 in the cockpit windshield display system shown in FIG. 1. As shown in FIG. 8, the display apparatus 1 includes an image generation unit 11 and an optical imaging unit 12. The image generation unit 11 generates a real image a, and a display surface of the real image a is a curved surface. The optical imaging unit 12 is a reflection imaging element. The optical imaging unit 12 maybe a concave reflector, and a reflective concave surface of the concave reflector may face the display surface of the real image a. Real image light generated by the real image a is incident onto the optical imaging unit 12 and is reflected by the optical imaging unit 12. A beam reflected by the optical imaging unit 12 is an imaging beam. An enlarged virtual image b corresponding to the real image a is formed on a reverse extension line of the imaging beam. A display surface of the virtual image b is a curved surface adaptive to the display surface of the real image a. When the display apparatus 1 is applied to the cockpit windshield display system shown in FIG. 1, an image surface (that is, a reflective concave surface) of the optical imaging unit 12 is opposite to an inner surface of the windshield 2. In this way, the imaging beam is incident onto the inner surface of the windshield 2 and is reflected by the inner surface of the windshield 2 to eyes of a driver. Therefore, the windshield 2 performs mirror imaging on the enlarged virtual image b, and a virtual image c having a same size as the virtual image b is formed on an outer side of the windshield 2. In this way, the driver can view the virtual image c on the windshield 2. It should be noted that in this embodiment, to form the enlarged virtual image b on the reverse extension line of the imaging beam, a distance between the optical imaging unit 12 and each point on the real image a generated by the image generation unit 11 needs to be less than an equivalent focal length of the optical imaging unit 12.

In this way, real image light of the real image a generated by the image generation unit 11 is deflected through reflection of the optical imaging unit 12 once, and then is incident onto the windshield 2. An arrangement direction of the image generation unit 11 and the optical imaging unit 12 and an arrangement direction of the optical imaging unit 12 and the windshield 2 form an angle, which helps to reduce a size of the display apparatus 1 in the arrangement direction of the optical imaging unit 12 and the windshield 2. The size of the display apparatus 1 in the arrangement direction of the optical imaging unit 12 and the windshield 2 is a height occupied by the display apparatus 1 in the display system. Therefore, this helps to reduce the height occupied by the display apparatus 1 in the display system.

It should be noted that the display surface of the real image a generated by the image generation unit 11 may be a concave arc surface, a convex arc surface, a wave-like curved surface, or the like, which is not limited herein. FIG. 8 shows only an example in which the display surface of the real image a is a concave arc surface recessed to the inside of the image generation unit 11, and this constitutes no limitation on a bending shape of the display surface of the real image a.

In the embodiment shown in FIG. 8, the image generation unit 11 may be the same as the image generation unit in the embodiment shown in FIG. 3 or FIG. 4, and details are not described herein again.

The display apparatus may include the image generation unit and the optical imaging unit. The image generation unit is configured to generate a real image whose display surface is a curved surface, and the optical imaging unit is configured to perform imaging on the real image to generate an enlarged virtual image corresponding to the real image, where a display surface of the virtual image is a curved surface adaptive to the display surface of the real image. Therefore, when the display apparatus is applied to the foregoing display system, an image surface of the optical imaging unit of the display apparatus is opposite to the reflective display window. An imaging beam emitted from the image surface of the optical imaging unit is incident onto the reflective display window and is reflected by the reflective display window to eyes of a user, so that the user can view, on the reflective display window, the enlarged virtual image generated by the optical imaging unit. Because the display surface of the virtual image is a curved surface, and a curved image can bring better visual experience than a planar image, a sense of presence and immersion is improved.

The display system may include the display apparatus. Therefore, the display system and the display apparatus may resolve a same problem and achieve a same expected effect.

Figure 9:
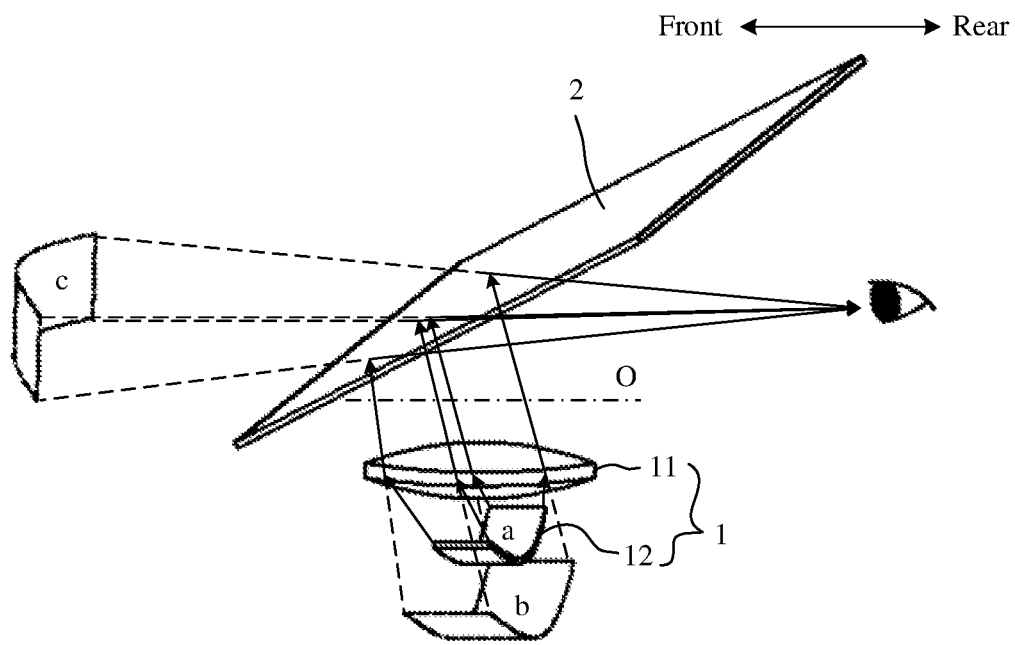
FIG. 9 is a schematic diagram of a structure of a display system according to some other embodiments.

In a display system, as people seek for display of a large picture, a picture displayed on a reflective display window becomes increasingly larger. When a user needs to view image information at an edge of a display picture, the user needs to move a line of sight at an amplitude to view the image information, and visual experience is relatively poor. For example, when the display system is a cockpit windshield display system, if a driver moves a line of sight in a driving process, driving security is greatly reduced, and a probability of a traffic accident greatly increases. To avoid this problem, in some embodiments, as shown in FIG. 9, the display surface of the real image a generated by the image generation unit 11 of the display apparatus 1 is a concave arc surface recessed to the inside of the image generation unit 11. A circle center line 0 of the display surface of the virtual image b generated by the optical imaging unit 12 extends in a front and rear direction of the windshield 2. In this way, as shown in FIG. 9, the display surface of the virtual image c viewed by a driver on the windshield 2 is an arc line extending around the driver along a horizontal direction. In this way, in a driving process, the driver can view image information at an edge of a display picture without moving a line of sight, thereby improving driving security and visual experience.

In the embodiments, the features, structures, materials, or characteristics may be combined in a proper manner in any one or more of embodiments or examples.

It should be noted that the foregoing embodiments are merely intended for describing the solutions, but are not limiting. Although described in detail with reference to the foregoing embodiments, persons of ordinary skill in the art should understand that they may still make modifications to the solutions described in the foregoing embodiments or make equivalent replacements to some features thereof, without departing from the scope of the embodiments.

What is claimed is:

1. A display apparatus, comprising:
   an image generation unit configured to generate a real image whose display surface is a curved surface;
   an optical imaging unit, configured to perform imaging on the real image and generate an enlarged virtual image corresponding to the real image, wherein a display surface of the virtual image is a curved surface adaptive to the display surface of the real image;
   wherein the image generation unit further comprises:
   a diffusing screen, wherein a diffusing surface of the diffusing screen is a curved surface, and the diffusing surface of the diffusing screen is the display surface of the real image: and
   a projection apparatus, configured to generate an image beam whose imaging surface is adaptive to the diffusing surface of the diffusing screen, and the image beam is projected onto the diffusing surface of the diffusing screen, to form the real image.

2. The display apparatus according to claim 1, wherein the optical imaging unit is a concave reflector, and a reflective concave surface of the concave reflector faces the display surface of the real image.

3. The display apparatus according to claim 1, wherein the optical imaging unit is a lens group, the lens group comprises at least one stacked lens, and an end surface of the lens group faces the display surface of the real image along a stacking direction of the at least one lens.

4. The display apparatus according to claim 1, wherein the projection apparatus further comprises:
a projection host, configured to generate an image beam whose imaging surface is a planar surface; and
a spatial light modulator, wherein the spatial light modulator is opposite to a light emitting surface of the projection host, and the spatial light modulator is configured to adjust a phase of each light ray in the image beam whose imaging surface is a planar surface, to generate an image beam whose imaging surface is adaptive to the diffusing surface of the diffusing screen.

5. The display apparatus according to claim 4, wherein the spatial light modulator is a liquid crystal on silicon spatial light modulator or a micro electro mechanical systems spatial light modulator.

6. The display apparatus according to claim 4, wherein the projection apparatus further comprises:
a first lens, wherein the first lens is located between the projection host and the spatial light modulator and is configured to converge image beams generated by the projection host to the spatial light modulator.

7. The display apparatus according to claim 4, wherein the projection apparatus further comprises:
a second lens, wherein the second lens is located on a light emitting side of the spatial light modulator, and is configured to converge, to the diffusing screen, image beams modulated by the spatial light modulator.

8. The display apparatus according to claim 1, wherein the diffusing screen further comprises:
a support structure, wherein the support structure is a curved sheet-like structure; and
a flexible screen body, wherein the flexible screen body is attached and fastened to a surface of the support structure, and the diffusing surface of the diffusing screen is a surface that is of the screen body and that is away from the support structure.

9. The display apparatus according to claim 8, wherein the support structure may be a structure that can be bent.

10. The display apparatus according to claim 9, wherein the support structure further comprises a first material layer and a second material layer that are stacked, a coefficient of thermal expansion of the first material layer is different from a coefficient of thermal expansion of the second material layer, and the screen body is located on a side that is of the first material layer and that is away from the second material layer; and the diffusing screen further comprises:
a temperature adjustment apparatus configured to adjust a temperature of the support structure.

11. The display apparatus according to claim 1, wherein the image generation unit is a curved display screen or a display device with a curved display screen.

12. The display apparatus according to claim 11, wherein the image generation unit is a display screen with a flexible curved surface.

13. The display apparatus according to claim 1, wherein the display surface of the real image generated by the image generation unit is a concave arc surface recessed to the inside of the image generation unit.

14. The display apparatus according to claim 1, wherein the diffusing screen is a diffusing screen of a transmission display or a diffusing screen of a reflection display.

15. The display apparatus according to claim 1, wherein a distance between the real image on the curved surface and the optical imaging unit is less than an equivalent focal length of the optical imaging unit.

16. A display system, comprising:
a reflective display window;
a display apparatus, wherein an image surface of an optical imaging unit of the display apparatus faces the reflective display window, and a user can view, by using the reflective display window, an enlarged virtual image generated by the optical imaging unit; wherein the display apparatus comprises:
an image generation unit configured to generate a real image whose display surface is a curved surface;
the optical imaging unit, configured to perform imaging on the real image and generate an enlarged virtual image corresponding to the real image, wherein a display surface of the virtual image is a curved surface adaptive to the display surface of the real image;
wherein the image generation unit further comprises:
a diffusing screen, wherein a diffusing surface of the diffusing screen is a curved surface, and the diffusing surface of the diffusing screen is the display surface of the real image; and
a projection apparatus, configured to generate an image beam whose imaging surface is adaptive to the diffusing surface of the diffusing screen, and the image beam is projected onto the diffusing surface of the diffusing screen, to form the real image.

17. The display system according to claim 16, wherein the reflective display window is a windshield at the front of a cockpit or a bathroom mirror.

18. The display system according to claim 16, wherein a display surface of a real image generated by an image generation unit of the display apparatus is a concave arc surface recessed to the inside of the image generation unit, and a circle center line of a display surface of a virtual image generated by the optical imaging unit extends in a front and rear direction of the reflective display window.

19. An automobile, comprising a display apparatus and a windshield, wherein the windshield is configured to reflect imaging beams generated by the display apparatus to a driver's eyes; wherein the display apparatus comprises:
an image generation unit configured to generate a real image whose display surface is a curved surface; and
an optical imaging unit, configured to perform imaging on the real image and generate an enlarged virtual image corresponding to the real image, wherein a display surface of the virtual image is a curved surface adaptive to the display surface of the real image;
wherein the image generation unit further comprises:
a diffusing screen, wherein a diffusing surface of the diffusing screen is a curved surface, and the diffusing surface of the diffusing screen is the display surface of the real image; and
a projection apparatus, configured to generate an image beam whose imaging surface is adaptive to the diffusing surface of the diffusing screen, and the image beam is projected onto the diffusing surface of the diffusing screen, to form the real image.

20. The automobile according to claim 19, wherein the optical imaging unit is a concave reflector, and a reflective concave surface of the concave reflector faces the display surface of the real image.

* * * * *